(12) United States Patent
Kramer et al.

(10) Patent No.: US 7,634,544 B2
(45) Date of Patent: Dec. 15, 2009

(54) LOCATION BASED MESSAGING

(75) Inventors: Douglas C. Kramer, Bothell, WA (US);
Peter O. Vale, Redmond, WA (US);
Derek Sunday, Renton, WA (US);
James Stephens, II, Redmond, WA (US);
Christian N. Wiswell, Seattle, WA (US); Edward N. Price, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 339 days.

(21) Appl. No.: 11/770,916

(22) Filed: Jun. 29, 2007

(65) Prior Publication Data
US 2009/0003346 A1 Jan. 1, 2009

(51) Int. Cl.
*G06F 15/16* (2006.01)
(52) U.S. Cl. .............. 709/206; 709/203; 709/204; 709/205; 455/456.3; 455/466
(58) Field of Classification Search ............ 709/203, 709/204, 205, 206; 455/456.3, 466
See application file for complete search history.

(56) References Cited

U.S. PATENT DOCUMENTS

| | | | |
|---|---|---|---|
| 6,801,932 B1 * | 10/2004 | Picoult et al. ............... 709/206 |
| 7,284,033 B2 * | 10/2007 | Jhanji ......................... 709/206 |
| 7,373,383 B2 * | 5/2008 | Boss et al. ................... 709/206 |
| 7,565,136 B1 * | 7/2009 | Kinsella .................. 455/412.1 |
| 2004/0054730 A1 * | 3/2004 | Carter et al. ................ 709/206 |

* cited by examiner

*Primary Examiner*—Jingsong Hu
(74) *Attorney, Agent, or Firm*—Workman Nydegger

(57) ABSTRACT

The present invention extends to methods, systems, and computer program products for location based messaging. A user at one computer system selects at least on other computer system that is to receive an electronic message. The at least one other computer system is selected based on the location of the at least one other computer system, without having to know an electronic identifier of any users at the at least one other computer system. The computer system refers to a mapping that maps computer systems locations to corresponding electronic addresses. Messages can then be sent to the electronic addresses. Accordingly, embodiments of the present invention facilitate at least semi-anonymous electronic communication in a network computing environment and significantly mitigate the perceived need of an immediate response that is often associated with responding to (potentially in person) verbal communication.

20 Claims, 3 Drawing Sheets

LOCATION BASED MESSAGING

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Thus, the performance of many computing tasks are distributed across a number of different computer systems and/or a number of different computing components.

Accordingly, one task computer systems typically perform is the exchange of electronic messages, such as, for example, to execute distributed programs, to deliver information from one user to another, etc. Various different types of electronic messages, such as, for example, instant messages, electronic mail messages, etc. can be used to deliver information from one user to another.

Typically, to send an electronic message to a desired recipient user, a sending user indicates that the electronic message is to be delivered to a known electronic identifier corresponding to the desired recipient user. The electronic identifier can be a name, telephone number, electronic mail address, instant messaging alias, etc. The electronic message is then delivered to a computer system (e.g., an electronic mail server or the designated recipient user's computer system) that receives messages for the known electronic identifier. The designated recipient user can then, through further network communication and/or direct interaction with the computer system, access the electronic message. It is not important where the designated recipient user is located. The designated recipient user may be able to use computer systems at any number of different locations to access messages that were sent to the designated recipient user based on the known identifier.

In venues (e.g., restaurants, airports, private clubs, ect.) where one or more persons are unknown to each other, verbal communication can still occur. That is, you do not need to know a persons name to say hello, ask them for directions, order a drink, etc. However, similar electronic communication is typically not possible.

For example, in many in public (e.g., restaurants, airports, restaurants, etc.) and semi-private (private clubs, parties, frequent flyer clubs, etc.) venues, numbers of computer systems are made available for general use. Within these types of venues, users at different computer systems may desire to communicate electronically with one another. However, without prior knowledge of personally identifiable information for a recipient user, a sending user typically has no way to indicate where an electronic message is to be delivered. This is unfortunate, since electronic communication is typically less invasive that direct human interaction and reduces the immediacy typically associated with responding to verbal communication initiated by another.

BRIEF SUMMARY

The present invention extends to methods, systems, and computer program products for location based messaging. Embodiments of the invention include a computer system sending an electronic message to a specified physical location. The computer system presents location data that indicates the physical location of a plurality of computer systems, including the computer system, relative to one another. The computer system receives a selection of at least one computer system from among the plurality of computer systems. The selection indicates that an electronic message is to be sent to the physical location of the at least one selected computer system.

The computer system receives input data representing the body of an electronic message. The computer system refers to a mapping to identify any electronic addresses corresponding to the at least one selected computer system. The mapping maps the physical location of each of the plurality of computer systems to a corresponding electronic address. Accordingly, the mapping facilitates sending electronic messages to computer systems based on physical location without having to know personally identifiable information for any users at the computer systems. The computer system sends the received input data to the identified electronic addresses.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
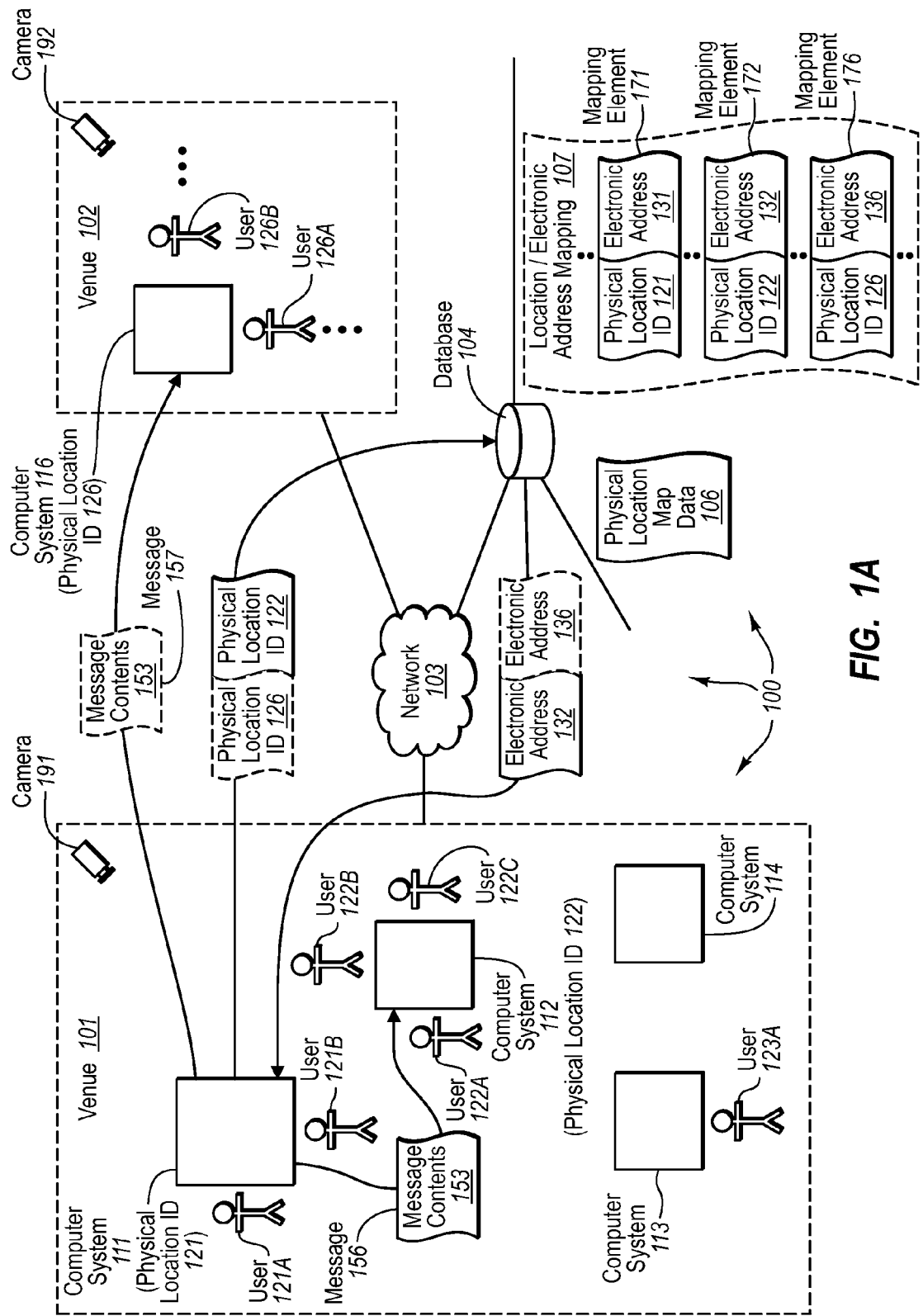
FIG. 1A illustrates an example computer architecture that facilitates location based messaging.

The present invention extends to methods, systems, and computer program products for location based messaging.

Embodiments of the invention include a computer system sending an electronic message to a specified physical location. The computer system presents location data that indicates the physical location of a plurality of computer systems, including the computer system, relative to one another. The computer system receives a selection of at least one computer system from among the plurality of computer systems. The selection indicates that an electronic message is to be sent to the physical location of the at least one selected computer system.

The computer system receives input data representing the body of an electronic message. The computer system refers to a mapping to identify any electronic addresses corresponding to the at least one selected computer system. The mapping maps the physical location of each of the plurality of computer systems to a corresponding electronic address. Accordingly, the mapping facilitates sending electronic messages to computer systems based on physical location without having to know an identifier for any users at the computer systems. The computer system sends the received input data to the identified electronic addresses.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates location based messaging. As depicted, computer architecture 100 includes database 104 as well as a number of computer systems in venues 101 and 102. Each of the various computer systems can be connected to network 103, such as, for example, a Local Area Network ("LAN"), a Wide Area Network ("WAN"), or even the Internet. Thus, the various computer system and database components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, venue 101 includes computer systems 111, 112, 113, and 114. Some of the computer systems in venue 101 have one or more users (e.g., patrons of venue 101) in relatively close physical proximity (e.g., in chairs near corresponding input and output devices). For example, users 121A and 121B are located in close physical proximity to computer system 111, users 122A, 122B, and 112C are located in close physical proximity to computer system 121, and user 123A is located in close proximity to computer system 113.

Also as depicted, venue 102 includes computer system 116 as well as other computer systems represented by the horizontal and vertical ellipses. Some of the computer systems in venue 102 have one or more users (e.g., patrons of venue 102) in relatively close physical proximity (e.g., in chairs near corresponding input and output devices). For example, users 126A and 126B are located in close physical proximity to computer system 116.

Venue 102 can be a different room at the same location as venue 101 or can be in a different location than venue. Virtually any physical distance can sepearte venue 101 and venue 102.

Database 104 includes physical location map data 106 and location/electronic address mapping 107. Physical location map data 106 includes data that can be used to create maps indicating the physical locations of computer systems relative to one another at various venues. Physical location map data 106 can be maintained on a per venue basis by venue owners and/or designated representatives. Physical location map data 106 can indicate computer system's location within a room using a coordinate system or some other mechanism for quantifying distances.

Each computer system within a venue can be assigned a physical location ID. Physical location IDs can be stored in physical location map data 106 and used to identify a computer system at a specified physical location. For example, physical location ID 121 can be used to identify the physical location of computer system 111. When physical location map data 106 is used to create a venue map, physical location IDs can be presented within the map to reference corresponding computer systems. For example, computer systems can be presented as selectable icons that are labeled with corresponding physical location identifiers.

Location/electronic address mapping 107 includes a plurality of mapping elements, such as, for example, mapping elements 171, 172, and 176, that map between physical location IDs and corresponding electronic (e.g., IP) addresses. Thus, location/electronic address mapping 107 includes data that can be used to obtain an electronic address for a computer system that has otherwise been referenced using a physical location ID (or vice versa). Mapping elements included in location/electronic address mapping 107 can also be maintained on a per venue basis by venue owners and/or designated representatives.

Although not expressly depicted in computer architecture 100, database 104 can include modules for receiving queries from requesting computer systems, accessing data responsive to queries, and returning accessed data to the requesting computer systems. Thus, database 104 can receive queries from computer systems that are attempting to identify an electronic address for one or more other computer systems. In some embodiments, one computer system submits a query that includes physical location IDs for one or more other computer systems and that requests database 104 to return corresponding electronic addresses for the one or more other computer systems.

In response to such a request, database 104 can refer location/electronic address mapping 107. For each received physical location ID, Database 104 can scan through mapping elements within location/electronic address mapping 107. When the received physical location ID is identified within a mapping element, database 104 can access and return the corresponding electronic address from the mapping element. If the physical location ID is not identified, database 104 can indicate this to the requesting computer system. Thus, in response to receiving a list of physical location IDs from a requesting computer system, database 104 can return a list of corresponding electronic addresses to a requesting computer system.

In some embodiments, each venue and/or each computer system can also maintain a mapping between locations and electronic addresses, such as, for example, in a database or list. Venue and/or computer system mappings can be maintained instead of or in combination with database 104. Thus, in these embodiments a computer system can refer to a local or venue based mapping to obtain electronic addresses for other computer systems. For example, to obtain an electronic address for a recipient computer system that is in the same venue as a sending computer system, the sending computer system can refer to computer system or venue based mapping.

Venues can include video cameras configured to provide video data representing the arrangement of computer systems and patrons in (at least a portion of) the venue. Video data from one venue can be made available to computer systems at other venues. Thus, computer users at one venue can watch video data from another venue to see if anyone is in the vicinity of a computer system in the other venue.

For example, venues 101 and 102 include cameras 191 and 192 respectively. Camera 191 is configured to monitor computer systems and computer users at venue 101. Similarly, camera 192 is configured to monitor computer systems and computer users at venue 101. Camera 191 can provide network accessible video data to other venues, such as, for example, venue 102. Similarly, camera 182 can provide network accessible video data to other venues, such as, for example, venue 101. Accordingly, via network 103, computer systems in venue 101 can view video data from camera 192 to determine the arrangement of computer users and computer systems at venue 102. Similarly, via network 103, computer systems in venue 102 can view video data from camera 191 to determine the arrangement of computer users and computer systems at venue 101.

Figure 1B:
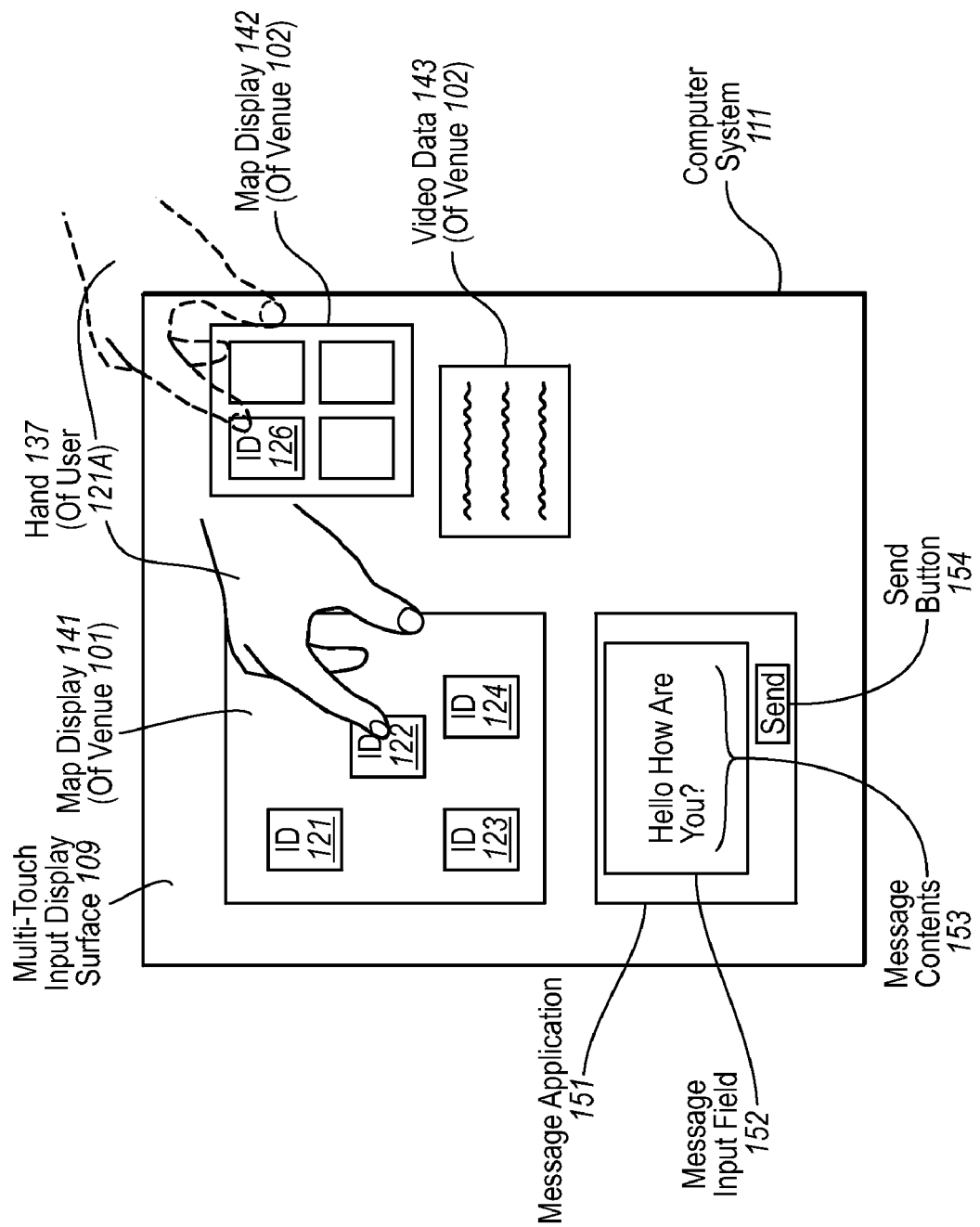
FIG. 1B illustrates an expanded view of one of the computer systems included in the example computer architecture of FIG. 1A.

FIG. 1B illustrates an expanded view of one computer system 111 included in computer architecture 100. In some embodiments, computer system 111 is a table top computer system that includes sensors configured to detect when a physical object (e.g., a bottle, a glass, a finger, a hat, etc.) has come into physical contact with a portion of the multi-touch input display surface 109. For example, the sensors can detect when a portion of hand 137 has come in contact with multi-touch input display surface 109. The sensors can be embedded in multi-touch input display surface 109 and can include for example, pressure sensors, temperature sensors, image scanners, barcode scanners, etc., that interoperate with a sensor interface to detect multiple simultaneous inputs.

Sensors can be included (e.g., embedded) in a plurality of locations across multi-touch input display surface 109. The sensors can detect locations where physical contact with multi-touch input display surface 109 has occurred. The density of sensors can be sufficient such that contact across the entirety of touch input display surface 109 can be detected. Thus, the sensors are configured to detect and differentiate between simultaneous contact at a plurality of different locations on the multi-touch input surface 109

In some embodiments, multi-touch input display surface 109 includes sensors for implementing a touch screen interface. For example, multi-touch input display surface 109 can include an interactive multi-touch surface. Thus, it may be that multi-touch input display surface 109 also functions as a presentation surface to display video output data to a user of computer system 111. Accordingly, multi-touch input surface 109 can function both as in input and as an output device for computer system 111. However, it should be understood that virtually any other type of input and/or output device can also interoperate with computer system 111 to implement the principles of the present invention.

Computer system 111 can access physical location map data 106 and generate corresponding venue maps. The generated maps, such as, for example, map displays 141 (of venue 101) and 142 (of venue 102), can be displayed on multi-touch input display surface 109. Generated maps can generally represent the physical location of tables relative to one another within a specified venue. For example, map display 141 represents a physical layout of (at least a portion of) venue 101 that generally corresponds to the actual physical layout of venue 101 as depicted in FIG. 1A.

A map display can depict each computer system within a venue (or portion thereof) can be represented using a corresponding icon. Each icon can be labeled with the corresponding physical location ID (e.g., table 12, left corner table, T-457, etc.) of the computer system it represents. Thus, from within displayed maps, users of computer system 111 can designate other computer systems as electronic message recipients. For example, a finger of hand 137 (e.g., use 121A's hand) can touch ID 122 to select computer system 112 as an electronic message recipient.

Computer system 111 is also presenting video data 142 (from venue 102) on multi-touch input display surface 109. Presentation of video data 143 permits user 121A (and other users of computer system 111) to vide inside venue 102.

Computer system 111 also includes message application 151. Message application 151 includes message input field 152. Users at computer system 111 can enter the content of a message (e.g., text, multi-media content, etc.) into message input field 152. When the message is complete, a user can select (e.g., touch) send control 154 to send the message (e.g., to selected tables at venue 101 and/or venue Accordingly, user 121A can select one or more computer systems from map display 141 and/or map display 142, enter message contents (e,g,. message contents 153) into message input field 152, and select send control 154 to send the message contents to the one or more selected computer systems. Through reference to mapping elements in location/electronic address mapping 107, message contents can be sent to a computer system without having to know an identifier (e.g., electronic mail address, instant messaging alias, etc) for a user at the computer system. Further, message contents can be sent to a computer system even when no user is at the computer system.

Figure 2:
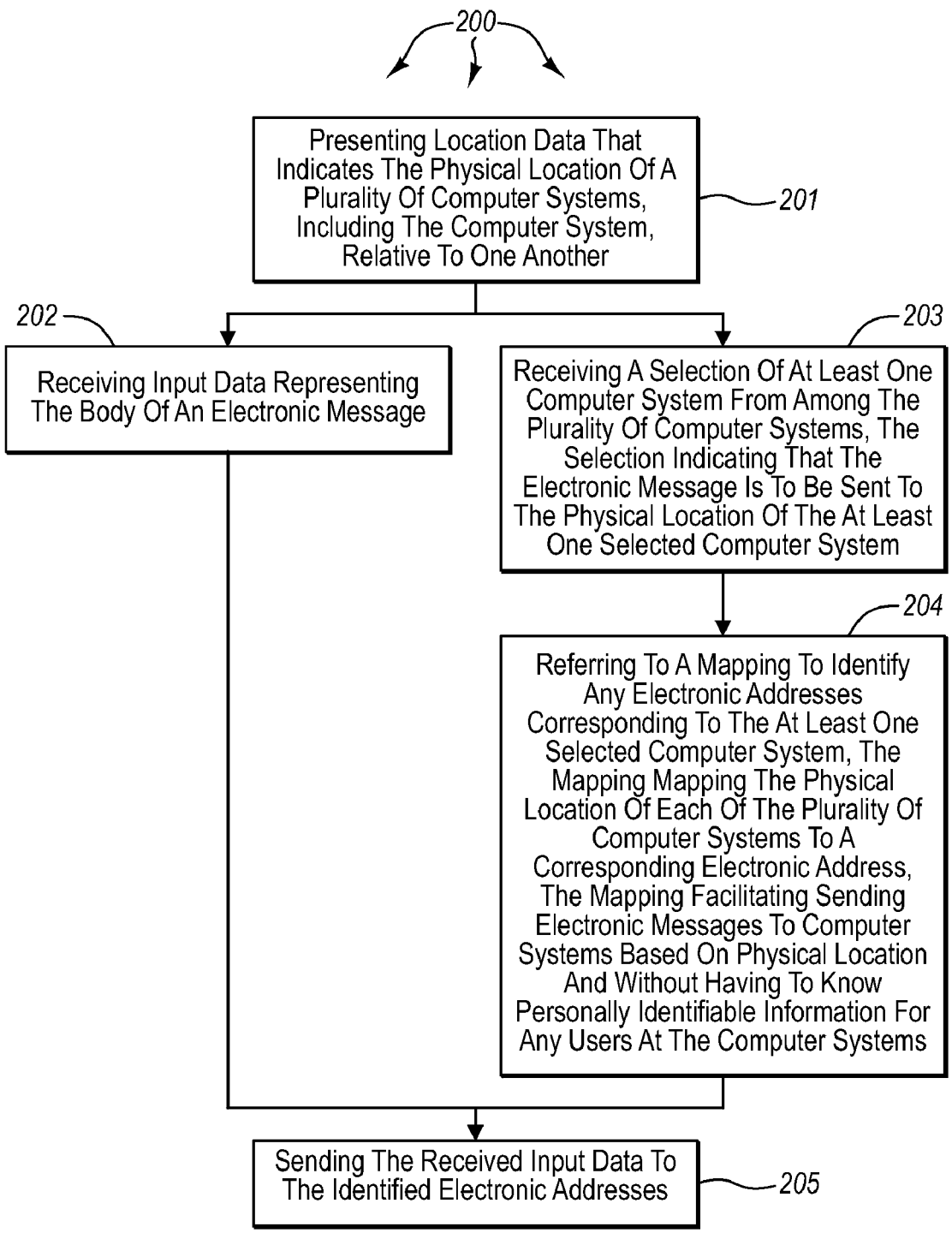
FIG. 2 illustrates a flow chart of an example method for sending an electronic message to a specified physical location.

FIG. 2 illustrates a flow chart of an example method for sending an electronic message to a specified physical location. The method 200 will be described with respect to the components and data depicted in computer architecture 100.

Method 200 includes an act of presenting location data that indicates the physical location of a plurality of computer systems, including the computer system, relative to one another (act 201). For example, computer system 111 can display map display 141 (of venue 101). Map display 141 indicates the location of computer systems in venue 101, including computer system 111, relative to other computer systems in venue 101. Computer system 111 can also display map display 142 (of venue 102). Map display 142 indicates the location of computer systems in venue 102, including computer system 116, relative to other computer systems in venue 102.

Method 200 includes an act of receiving input data representing the body of an electronic message (act 202). For example, message application 151 can receive messages contents 153 in message input field 152. User 121A can input message contents 152 using an input device, such as, for example, a real or virtual keyboard. Although text is expressly depicted in message contents 153, virtually and type of message contents (graphical, audio, video, URL, etc.) can be entered into message input field 152.

Method 200 includes an act of receiving a selection of at least one computer system from among the plurality of computer systems, the selection indicating that the electronic message is to be sent to the physical location of the at least one selected computer system (act 203). For example, using hand 137 (or a stylus or other pointing device), user 121A can select an icon labeled ID 122 from map display 141. The selection of ID 122 indicates that message contents 153 are to be sent to the physical location of computer system 112. Using hand 137 (or a stylus or other pointing device) user 121A can also select an icon labeled ID 126 from map display 142. The selection of ID 126 indicates that message contents 153 are to be sent to the physical location of computer system 116.

A plurality of computer systems in a venue can also be selected. For example, user 121A can individually select multiple icons in a venue. Alternately, user group selection mechanism to select a group of icons. For example, user 121A can draw an outline around icons labeled 122D, 123D, and 124D on multi-touch input display surface 109 to select computer systems 112, 113, and 114. Thus, a user can send an electronic message to a plurality of different computer systems, such as, for example, an entire side of a venue, anyone wear clothing for a particular sports team, etc.

Method 200 includes an act of referring to a mapping to identify any electronic addresses corresponding to the at least one selected computer system (act 204). The mapping maps the physical location of each of the plurality of computer systems to a corresponding electronic address. The mapping facilitates sending electronic messages to computer systems based on physical location and without having to know personally identifiable information (e.g., electronic mail address, telephone number, etc.) for any users at the computer systems. Thus, generally, computer system 111 can refer to location/electronic address mapping 107 to identify an electronic (e.g., IP) address for computer system 112 and/or computer system 116.

In some embodiments, computer system 111 submits physical location identifiers for selected computer systems to database 104. For example, computer system 111 can submit physical location ID 122 and/or physical location ID 126 to data base 104. Database 104 can scan location/electronic address mapping 107 for mapping elements that contain physical location ID 122 and/or physical location ID 126. Thus, it may be that database identifies mapping element 172 and/or mapping element 176.

From identified mapping elements, database 104 can return corresponding electronic addresses. For example, database 104 can return electronic address 132 for computer system 112 and can return electronic address 136 for computer system 116. Computer system 111 can then use electronic address 132 and/or electronic address 136 to address messages containing message contents 153 to computer systems 112 and 116 as appropriate.

Method 200 includes an act of sending the received input data to the identified electronic addresses (act 205). For example, computer system 111 can use electronic address 132 to send message 156, containing message contents 153, to computer system 112. Similarly, computer system 111 can use electronic address 136 to send message 157, containing message contents 153, to computer system 116.

In some embodiments, such as, for example, when computer systems are table top computer systems, a sending user can also designate that a message be sent to a one or more specified areas of a presentation surface. For example, user 121A can designate that message contents 153 (in message 156) be presented on a multi-touch input display surface of computer system 112 at or near where users 122A and/or 112B are seated. Such presentation can include presenting message contents 153 in a location that is visible to both user 122A and user 122B. Alternately, such presentation can include presenting a separate copy of message contents 153 to each of user 122A and 112B.

Determining when to send message and what to send in a message to another computer system is within the discretion of a sending user. For example, it may be that user 121A recognizes user 122A as a friend or business associate. However, user 121A does not necessarily know or have access to an electronic identifier, such as, for example, an electronic mail address or instant messaging alias, for user 122A. Nonetheless, user 121A may desire to make contact with user 122A in a manner that does not disrupt verbal communication between user 122A and other users at or near computer system 112.

Thus, user 121A can refer to map display 141. From map display 141, user 121A can select ID 122 (and potentially the location of user 122A at computer system 112). User 121A can enter message contents for a message to user 122A and then use the send control to send the message to computer system 112. Accordingly, user 121A can indicate to user 122A that they have recognized user 122A in a relatively non-intrusive manner.

Alternately, by watching video data 143 (from venue 102), user 121A can see user 126B in venue 102 they would like to communicate with. User 121A can X refer to map display 142. From map display 142, user 121A can select ID 126 (and potentially the location of user 126B at computer system 116). User 121A can enter message contents for a message to user 126B and then use the send control to send the message to computer system 116. Accordingly, user 121A can indicate a desire to communicate in a relatively non-intrusive manner.

Further, determining when to when and how to reply to a received message from another computer system is within the discretion of a recipient user. For example, embodiments of the invention allow a recipient user to respond when they are able, without the perceived immediacy of having to response to (potentially in person) verbal communication. A recipient user can also easily and efficiently indicate (through a return electronic message) to a sending user that they do not wish to communicate. A recipient user can do so without the tension and/or embarrassment typically associated with terminating further (potentially in person) verbal communication with another.

Accordingly, embodiments of the present invention facilitate at least semi-anonymous electronic communication in a network computing environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a processor and system memory, a method for sending an electronic message to a specified physical location, the method comprising:
    an act of the processor presenting location data that indicates the physical location of a plurality of computer systems, including the computer system, relative to one another;
    an act of receiving input data for inclusion in an electronic message;
    an act of receiving a selection of at least one computer systems from among the plurality of computer systems, the selection indicating that the electronic message is to be sent to the physical location of the at least one selected computer systems;
    an act of the processor referring to a mapping to identify an identified electronic address corresponding to the at least one selected computer systems, the mapping mapping the physical location of each of the plurality of computer systems to a corresponding electronic address, the mapping facilitating sending electronic messages to any of the plurality of computer systems based on physical location and without having to know personally identifiable information for any users at the plurality of computer systems; and
    an act of sending an electronic message containing the received input data to the identified electronic address.

2. The method as recited in claim 1 wherein, the act of presenting location data that indicates the physical location of a plurality of computer systems comprises an act of presenting a map of a venue where the plurality of computer systems are located.

3. The method as recited in claim 1 wherein, the act of presenting location data that indicates the physical location of a plurality of computer systems comprises an act of presenting a map of a venue other than where the computer system is located.

4. The method as recited in claim 1 wherein, the act of presenting location data that indicates the physical location of a plurality of computer systems comprises an act of presenting location data on a multi-touch input display surface.

5. The method as recited in claim 1, wherein the act of receiving input data representing the body of an electronic message comprises an act of receiving one or more types of content selected from among: text content, graphics content, audio content, video content, and URL content.

6. The method as recited in claim 1, wherein the act of receiving a selection of at least one computer system from among the plurality of computer systems compressing an act of detecting contact on a multi-touch input display surface at an icon representing a computer system.

7. The method as recited in claim 1, wherein the act of receiving a selection of at least one computer system from among the plurality of computer systems compressing an act of receiving a selection of a computer system that is located in a different venue than the computer system.

8. The method as recited in claim 7, further comprising:
    an act of presenting video data from the different venue so that users of the computer system can see who is located near computer systems in the different venue.

9. The method as recited in claim 1, wherein the act of receiving a selection of at least one computer system from among the plurality of computer systems comprising an act of receiving an indication that a plurality of computer systems have been selected.

10. The method as recited in claim 1, further comprising:
    an act of accessing a physical location identifier for each of the at least one selected computer systems.

11. The method as recited in claim 10, wherein the act of referring to a mapping to identify an identified electronic addresses corresponding to the at least one selected computer systems comprises:
    an act of submitting a query to a database, the query including the physical location identifier for each of the at least one selected computer systems; and
    an act of receiving a response from the database, the response including a corresponding electronic address for each of the at least one selected computer systems.

12. The method as recited in claim 1, wherein the act of sending the received input data to the identified electronic address comprises an act of addressing messages containing the received input data to an Internet Protocol address for each of the at least one selected computer systems.

13. A computer program product for use at a computer system, the computer program product for implementing a method for sending an electronic message to a specified physical location, the computer program product comprising one or more physical storage media having stored thereon computer-executable instructions that, when executed at a processor, cause the computer system to perform the method, including performing the following:

present location data that indicates the physical location of a plurality of computer systems, including the computer system, relative to one another;

receive input data for inclusion in an electronic message;

receive a selection of at least one computer systems from among the plurality of computer systems, the selection indicating that the electronic message is to be sent to the physical location of the at least one selected computer systems;

refer to a mapping to identify an identified electronic address corresponding to the at least one selected computer systems, the mapping mapping the physical location of each of the plurality of computer systems to a corresponding electronic address, the mapping facilitating sending electronic messages to any of the plurality of computer systems based on physical location and without having to know personally identifiable information for any users at the plurality of computer systems; and send an electronic message containing the received input data to the identified electronic address.

14. The computer program product as recited in claim 13, wherein computer-executable instructions that, when executed, cause the computer system to present location data that indicates the physical location of a plurality of computer systems comprise computer-executable instructions that, when executed, cause the computer system to present a map of a venue where the plurality of computer systems are located.

15. The computer program product as recited in claim 13, wherein computer-executable instructions that, when executed, cause the computer system to present location data that indicates the physical location of a plurality of computer systems comprise computer-executable instructions that, when executed, cause the computer system to present location data on a multi-touch input display surface.

16. The computer program product as recited in claim 13, wherein computer-executable instructions that, when executed, cause the computer system to receive a selection of at least one computer system from among the plurality of computer systems comprise computer-executable instructions that, when executed, cause the computer system to receive an indication that a plurality of computer systems have been selected.

17. The computer program product as recited in claim 13, further comprising:

computer-executable instructions that, when executed, cause the computer system to accessing a physical location identifier for each of the at least one selected computer systems.

18. The computer program product as recited in claim 17, wherein computer-executable instructions that, when executed, cause the computer system to refer to a mapping to identify an identified electronic addresses corresponding to the at least one selected computer systems comprise computer-executable instructions that, when executed, cause the computer system to:

submit a query to a database, the query including the physical location identifier for each of the at least one selected computer systems; and receive a response from the database, the response including a corresponding electronic address for each of the at least one selected computer systems.

19. The computer program product as recited in claim 13, wherein computer-executable instructions that, when executed, cause the computer system to send the received input data to the identified electronic address comprise computer-executable instructions that, when executed, cause the computer system to address messages containing the received input data to an Internet Protocol address for each of the at least one selected computer systems.

20. A computer system, comprising a processor;

system memory;

a multi-touch input display surface; and one or more computer-readable media having stored thereon computer-executable instructions that, when executed at the processor, cause the computer system to perform the following:

present location data on the multi-touch input display surface that indicates the physical location of a plurality of computer systems, including the computer system, relative to one another;

receive input data at the multi-touch input display surface for inclusion in an electronic message;

receive a selection at the multi-touch input display surface of at least one computer systems from among the plurality of computer systems, the selection indicating that the electronic message is to be sent to the physical location of the at least one selected computer systems;

refer to a mapping to identify an identified electronic address corresponding to the at least one selected computer systems, the mapping mapping the physical location of each of the plurality of computer systems to a corresponding electronic address, the mapping facilitating sending electronic messages to each of the plurality of computer systems based on physical location and without having to know personally identifiable information for any users at the plurality of computer systems; and send an electronic message containing the received input data to the identified electronic addresses.

* * * * *

UNITED STATES PATENT AND TRADEMARK OFFICE
CERTIFICATE OF CORRECTION

PATENT NO. : 7,634,544 B2  Page 1 of 1
APPLICATION NO. : 11/770916
DATED : December 15, 2009
INVENTOR(S) : Douglas C. Kramer et al.

It is certified that error appears in the above-identified patent and that said Letters Patent is hereby corrected as shown below:

In column 7, line 25, after "venue" insert -- 102). --.

Signed and Sealed this
Third Day of May, 2011

David J. Kappos
*Director of the United States Patent and Trademark Office*